US009087154B1

(12) United States Patent
Seibert, Jr. et al.

(10) Patent No.: US 9,087,154 B1
(45) Date of Patent: Jul. 21, 2015

(54) SYSTEM AND METHOD FOR PROVIDING ADDITIONAL FUNCTIONALITY TO DEVELOPER SIDE APPLICATION IN AN INTEGRATED DEVELOPMENT ENVIRONMENT

(75) Inventors: Jeffrey H. Seibert, Jr., Cambridge, MA (US); Wayne Chang, Boston, MA (US); Matthew William Massicotte, Quincy, MA (US)

(73) Assignee: Crashlytics, Inc., Cambridge, MA (US)

( * ) Notice: Subject to any disclaimer, the term of this patent is extended or adjusted under 35 U.S.C. 154(b) by 230 days.

(21) Appl. No.: 13/567,262

(22) Filed: Aug. 6, 2012

Related U.S. Application Data

(63) Continuation-in-part of application No. 13/426,493, filed on Mar. 21, 2012, which is a continuation-in-part of application No. 13/323,166, filed on Dec. 12, 2011.

(51) Int. Cl.
G06F 11/36 (2006.01)

(52) U.S. Cl.
CPC ........ *G06F 11/3664* (2013.01); *G06F 11/3688* (2013.01)

(58) Field of Classification Search
None
See application file for complete search history.

(56) References Cited

U.S. PATENT DOCUMENTS

| | | | |
|---|---|---|---|
| 3,698,009 A | 10/1972 | Barbier | |
| 6,247,149 B1 | 6/2001 | Falls et al. | |
| 7,143,395 B2 * | 11/2006 | Applin et al. | 717/130 |
| 7,180,531 B2 * | 2/2007 | Gery et al. | 345/698 |
| 7,484,220 B2 | 1/2009 | Kelley et al. | |
| 8,219,649 B2 | 7/2012 | Ball | |
| 8,230,113 B2 * | 7/2012 | Birze et al. | 709/249 |
| 8,316,343 B2 * | 11/2012 | Birze et al. | 717/100 |
| 8,433,687 B1 * | 4/2013 | Pydi | 707/673 |
| 8,516,446 B2 * | 8/2013 | Williams et al. | 717/126 |
| 8,533,678 B2 * | 9/2013 | Halter et al. | 717/124 |
| 8,533,844 B2 | 9/2013 | Mahaffey et al. | |
| 8,683,462 B2 * | 3/2014 | Goldman | 717/174 |
| 8,732,530 B2 | 5/2014 | Ng | |
| 2003/0154470 A1 * | 8/2003 | Applin et al. | 717/170 |
| 2004/0030962 A1 | 2/2004 | Swaine et al. | |
| 2004/0123271 A1 * | 6/2004 | Bindewald et al. | 717/124 |
| 2004/0230954 A1 * | 11/2004 | Dandoy | 717/124 |
| 2005/0097133 A1 * | 5/2005 | Pham et al. | 707/104.1 |
| 2005/0120273 A1 | 6/2005 | Hudson et al. | |
| 2005/0190203 A1 * | 9/2005 | Gery et al. | 345/660 |
| 2006/0168587 A1 * | 7/2006 | Aslam-Mir | 718/105 |
| 2006/0174161 A1 * | 8/2006 | Sharma | 714/38 |
| 2007/0006150 A9 | 1/2007 | Walmsley | |
| 2008/0141221 A1 | 6/2008 | Benesovska et al. | |
| 2009/0019270 A1 * | 1/2009 | Halter et al. | 712/227 |
| 2009/0171484 A1 * | 7/2009 | Birze et al. | 700/86 |
| 2009/0171487 A1 * | 7/2009 | Wilhelm | 700/94 |

(Continued)

OTHER PUBLICATIONS

IBM Blueprints—"Configuring Remote Crash Dump on Linux Systems," XP055052042, Aug. 2009, 26 Pages.

(Continued)

*Primary Examiner* — Isaac T Tecklu
(74) *Attorney, Agent, or Firm* — Cesari and McKenna, LLP

(57) ABSTRACT

A developer analytic module executing on an integrated development environment provides location tracing of a software development toolkit and automatic updated of the SDK. The developer analytic module further provides data container transfer functionality to ensure that analytic logic has access to necessary data containers to perform symbolication and/or error detection.

17 Claims, 13 Drawing Sheets

(56) References Cited

U.S. PATENT DOCUMENTS

| | | | |
|---|---|---|---|
| 2009/0210747 A1 | 8/2009 | Boone et al. | |
| 2010/0174974 A1 | 7/2010 | Brisebois et al. | |
| 2010/0199257 A1 | 8/2010 | Biggerstaff | |
| 2010/0287525 A1* | 11/2010 | Wagner | 717/100 |
| 2011/0016356 A1 | 1/2011 | Artzi et al. | |
| 2011/0154305 A1* | 6/2011 | LeRoux et al. | 717/140 |
| 2011/0185220 A1 | 7/2011 | Foley et al. | |
| 2011/0209008 A1 | 8/2011 | Arapov | |
| 2011/0231361 A1* | 9/2011 | Patchava et al. | 707/602 |
| 2011/0246964 A1* | 10/2011 | Cox et al. | 717/122 |
| 2011/0289483 A1* | 11/2011 | Williams et al. | 717/126 |
| 2011/0302556 A1* | 12/2011 | Drukman et al. | 717/113 |
| 2012/0102483 A1* | 4/2012 | Goldman | 717/174 |
| 2012/0102485 A1* | 4/2012 | Goldman | 717/176 |
| 2012/0283852 A1* | 11/2012 | Birze et al. | 700/86 |
| 2012/0317155 A1 | 12/2012 | Ogasawara et al. | |
| 2012/0317638 A1 | 12/2012 | Carrara et al. | |
| 2013/0007700 A1* | 1/2013 | Villar et al. | 717/109 |
| 2013/0074031 A1* | 3/2013 | Birze et al. | 717/100 |
| 2013/0132933 A1* | 5/2013 | Rajaram et al. | 717/126 |
| 2013/0332943 A1* | 12/2013 | Sun et al. | 719/331 |
| 2014/0033183 A1* | 1/2014 | Brown | 717/131 |

OTHER PUBLICATIONS

PCT Notification of Transmittal of the International Search Report and the Written Opinion of the International Searching Authority, or the Declaration, Internatiional Searching Authority, International Application No. PCT/US2012/069074, mailed Apr. 2, 2013, 17 pages.

UNIX International, Programming Languages SIG, Revision 2.0, "DWARF Debugging Information Format," Jul. 27, 1993, Parsippany, NJ.

Fielding et al., Request for Comments: 2616 Hypertext Transfer Protocol—HTTP/1.1, Jun. 1999.

\* cited by examiner

SYSTEM AND METHOD FOR PROVIDING ADDITIONAL FUNCTIONALITY TO DEVELOPER SIDE APPLICATION IN AN INTEGRATED DEVELOPMENT ENVIRONMENT

RELATED APPLICATIONS

The present application is a continuation in part of U.S. patent application Ser. No. 13/426,493, filed on Mar. 21, 2012 by Wayne Chang and Jeffrey H. Seibert, Jr. and entitled System And Method For Data Collection And Analysis Of Information Relating To Mobile Applications, which is a continuation in part of U.S. patent application Ser. No. 13/323,166, filed on Dec. 12, 2011 by Wayne Chang and Jeffrey H. Seibert, Jr., and entitled System and Method for Data Collection and Analysis of Information Relating to Mobile Applications, the contents of both applications are hereby incorporated by reference.

TECHNICAL FIELD

The present disclosure relates generally to application debugging and, more particularly, to providing a developer of an application with tools for use in an integrated development environment.

BACKGROUND

Debugging is a process of finding and extracting bugs, error and/or defects (hereinafter generally "bugs"), in a computer program, such as an application, thus making the application behave as expected by the application developer. Conventionally, developers have been primarily limited to debugging applications prior to those applications being distributed to end users for installation on an end user's mobile device, e.g., a smart phone, personal digital assistant (PDA), tablet computer, etc. With the growth of applications that may be provided to end users across the world (e.g., mobile applications), developers have limited ways of receiving information as to what may cause specific bugs in the applications, while the application is being utilized by the end user and executed on an end user's device.

SUMMARY

The disadvantages of the prior art are overcome by providing a system and method for providing additional functionality in a developer side application associated with an integrated development environment ("IDE"). Specifically, the developer of the application may install analytic software, which may be embodied as a software development kit (SDK), on an IDE associated with the developer, wherein the analytic software may be installed with a wizard-like interface having a series of easy to follow instructions. The analytic software may be any type of software associated with a SDK, such as an advertising framework, or any other framework, as known by those skilled in the art. Illustratively, the analytic software is installed in a source code format that may be integrated into the developer's source code for the application. During compilation and/or a build of the application, the analytic software is incorporated into the application. Once installed, the application, with the analytic software incorporated therein, may be provided and installed on a plurality of end user devices. Thereafter, the analytic software may work in conjunction with analytic processing logic to assist the developer in obtaining pertinent information related to bugs associated with the application that is being executed on the end user devices.

Further, the analytic software provider also provides a developer analytic module that may be implemented as an application running at an IDE of a developer. The developer analytic module comprises a plurality of functions to improve the development cycle for developers.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

A. Environment

A computer network is a geographically distributed collection of entities interconnected by communication links and segments for transporting data between end nodes, such as personal computers and workstations. Many types of networks are available, with the types ranging from Wi-Fi networks, cell phone networks, local area networks (LANs) to wide area networks (WANs). Wi-Fi is a mechanism for wirelessly connecting a plurality of electronic devices (e.g., computers, cell phones, etc.). A device enabled with Wi-Fi capabilities may connect to the Internet via a wireless network access point, as known by those skilled in the art. Cellular networks are radio network distributed over land areas called "cells", wherein each cell may be served by at least one fixed-location transceiver known as a cell site or base station. When joined together, these cells may provide radio coverage over a wide geographic area. As known by those skilled in the art, this may enable a large number of portable transceivers (e.g., mobile phones) to communicate with each other. LANs typically connect the entities over dedicated private communications links located in the same general physical location, such as a building or campus. WANs, on the other hand, typically connect geographically dispersed entities over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between entities on various networks. The entities typically communicate over the network by exchanging discrete frames or packets of data according to predefined protocols, such as the Transmission Control Protocol/Internet Protocol (TCP/IP), Hypertext Transfer Protocol (HTTP). In this context, a protocol consists of a set of rules defining how the entities interact with each other and how packets and messages are exchanged.

Figure 1:
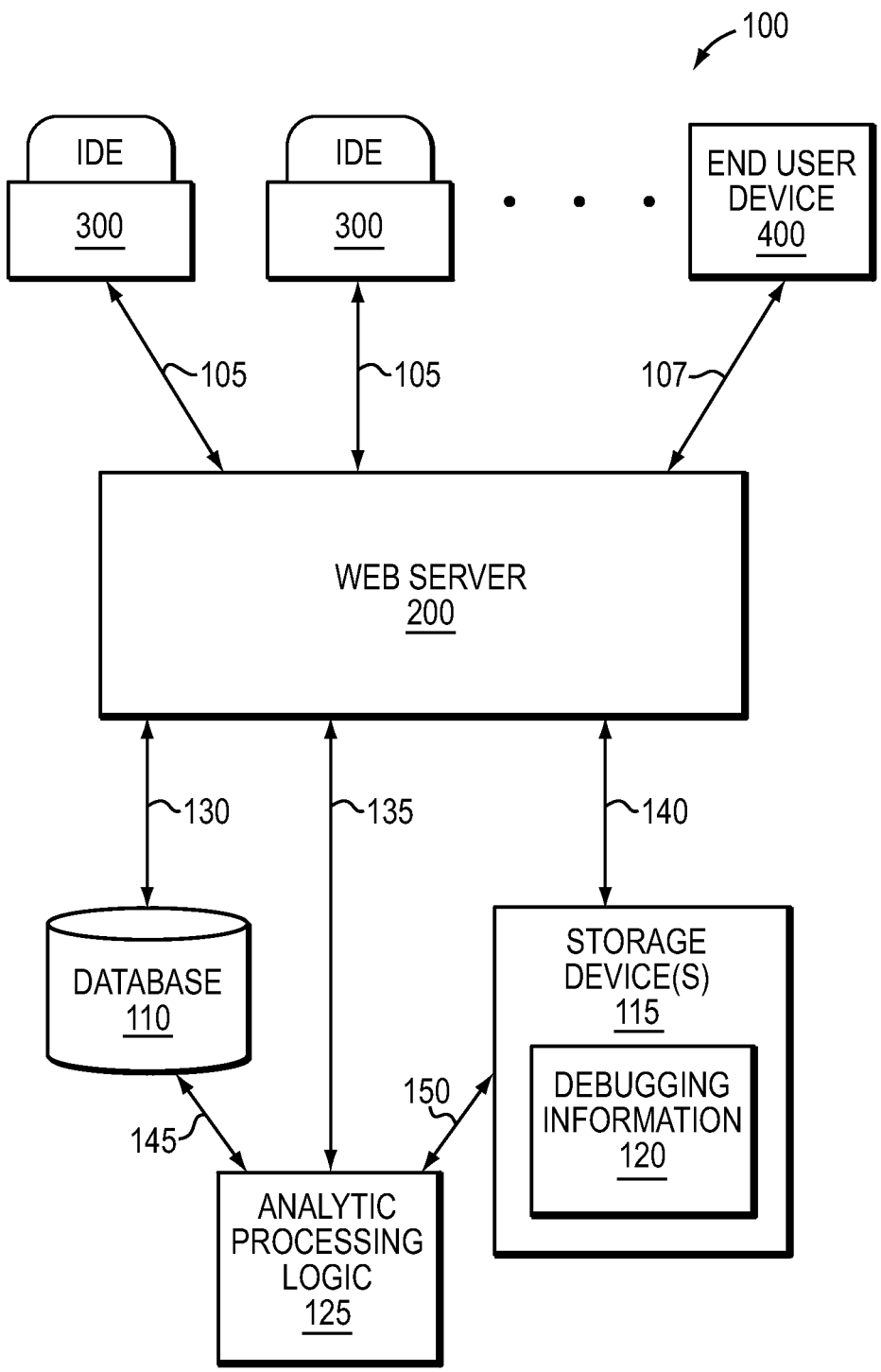
FIG. 1 is a schematic block diagram of an exemplary computing environment in accordance with an illustrative embodiment of the present invention.

FIG. 1 is a schematic block diagram of an exemplary computing environment 100 in accordance with an illustrative embodiment of the present invention. Specifically, the computing environment 100 may include one or more integrated development environments (IDE) 300 coupled to one or more web servers 200 (managed by an analytic service provider), interconnected by one or more communication links 105. Developer IDE 300, described further below in reference to FIG. 3, represent development environments utilized by application developers for creation of source code to be compiled, or otherwise built, to generate applications to be distributed for execution on end user device 400. Illustratively, IDE 300 may implement an Xcode development environment. As known by those skilled in the art, Xcode is a suite of tools for developing software on a Macintosh (MAC) Operating System X (OS), developed by Apple Inc. While the present invention is described in relation to IDE 300 utilizing Xcode, it should be noted that the teaching of the present invention may be utilized with any development environment. As such, all references to Xcode and/or Mac OS should be taken as exemplary only. Web server 200, described further below in reference to FIG. 2, is illustratively utilized to enable distribution of the analytic software to IDE 300, collection of data from IDE 300 and end user device 400, as well as provides proper message passing among the various entities in environment 100.

Further, end user device 400, database 110, analytic processing logic 125, and storage device(s) 115 may be coupled to web servers 200 via communication link(s) 107, 130, 135, 140, 145, and 150, respectively. Storage device(s) 115 may for example store debugging information (e.g., dSYM file), among other data associated with the IDE 300 and end user device 400. End user device 400, described further below in reference to FIG. 4, may comprise any device capable of executing applications. Illustratively, end user device 400 may comprise a smart phone, a personal digital assistant and/or a tablet computer. Exemplary smart phones may utilize the Android operating system, available from Google, Inc., and/or the iOS system, available from Apple, Inc. It should be noted that other smart phones may be utilized in alternative embodiments. As such, the description herein directed to development for iOS systems should be taken as exemplary only.

It is noted that links 105, 107, 130, 135, 140, 145, and 150 are depicted in FIG. 1 as separate and individual links for simplicity purposes, and that communications between the devices may occur over a single link (e.g., Internet), a plurality of links, or virtual links as know by those skilled in the art. Moreover, one or more web servers 200, database 110, analytic processing logic 125, and storage device(s) 115 may all reside on a single device, or a plurality of devices, and managed by the analytic service provider. The devices are shown as separate entities in FIG. 1 for simplicity purposes. Further, those skilled in the art will understand that any number of devices and/or links may be used in the computer environment, and that the view shown herein is for simplicity.

Figure 2:
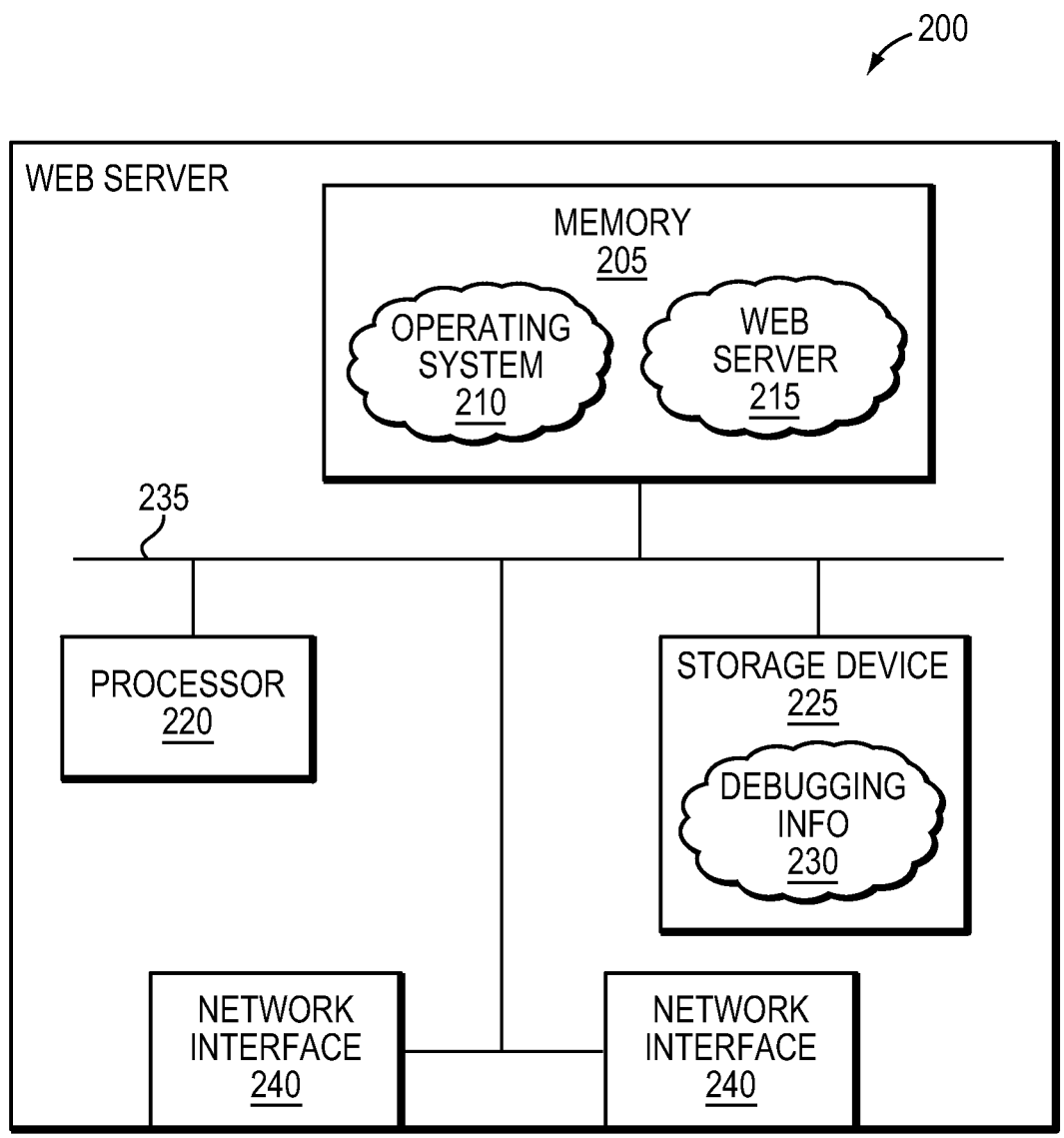
FIG. 2 is a schematic block diagram of an exemplary web server in accordance with an illustrative embodiment of the present invention.
Figure 3:
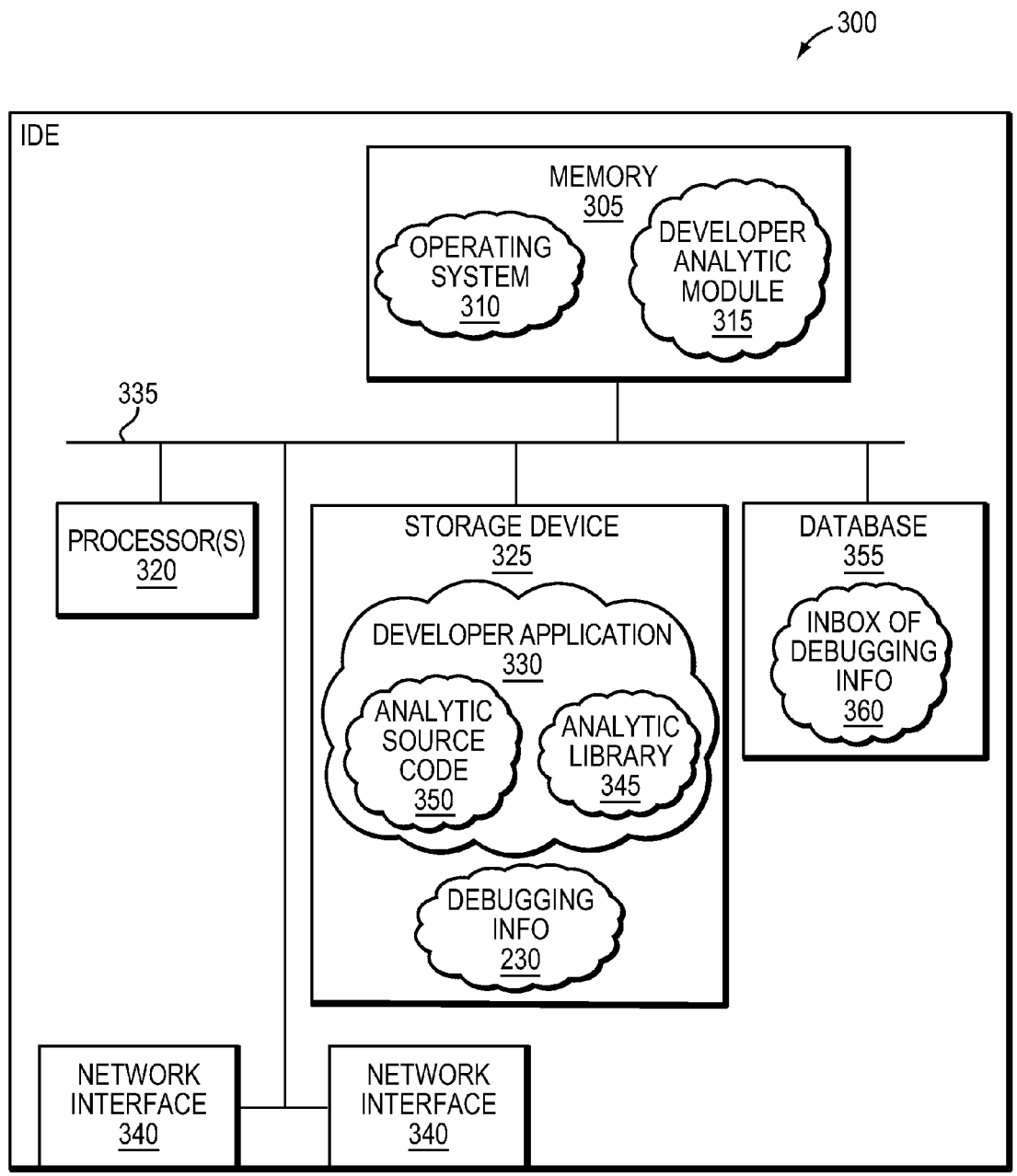
FIG. 3 is a schematic block diagram of an exemplary IDE in accordance with an illustrative embodiment of the present invention.

FIG. 2 is a schematic block diagram of an exemplary web server 200 in accordance with an illustrative embodiment of the present invention. The web server 200 may comprise a plurality of network interfaces 240, one or more processors 220, storage device 225, and a memory 205 interconnected by a system bus 235. The network interfaces 240 contain the mechanical, electrical, and signaling circuitry for communicating data over physical links coupled to a network, such as links 105, 107, 130, 135, 145, and 140. The network interfaces may be configured to transmit and/or receive data using a variety of different communication protocols, including, inter alia, TCP/IP, UDP, ATM, SONET, HTTP, wireless protocols, Frame Relay, Ethernet, Fiber Distributed Data Interface (FDDI), etc. Notably, a physical network interface 240 may also be used to implement one or more virtual network interfaces, such as for Virtual Private Network (VPN) access, known to those skilled in the art.

The memory 205 comprises a plurality of locations that are addressable by the processor(s) 220 and the network interfaces 240 for storing software programs and data structures associated with the embodiments described herein. The processor 240 may comprise necessary elements or logic adapted to execute the software programs and manipulate the data structures. An operating system 210, portions of which are typically resident in memory 205 and executed by the processor(s), functionally organizes the web server 200 by, inter alia, invoking network operations in support of software processes and/or services executing on the web server. A web server 215, portions of which are typically resident in memory 205 are executed by the processor(s), functionally store and execute logical commands inputted by the analytic service provider and developers. For example, web server 215 may implement a website managed by the analytic service provider, wherein developer may access that web site to obtain pertinent information associated with their applications and information associated with bugs incurred on the developer's application executing on an end user device. It should be noted that any system for distribution of the analytic software, collection of debugging information and crash data, etc. may be utilized. As such, the description of a web server should be taken as exemplary only. In alternative embodiments, the various functionalities may be distributed among a plurality of servers. As such, the description of a single web server 200 should be taken as exemplary only.

A storage device 225 may store debugging information 230, such as a dSYM file, that is sent, for example automatically, over the communication links from an IDE. Those skilled in the art will understand that a dSYM file may contain a plurality of mappings between memory offsets, such as addresses, and method names and line numbers associated with the built/compiled application created by the developer. The structure and information relating to a dSYM file and the functions associated therewith are well-known and described in more detail in "DWARF Debugging Information Format," dated Jul. 27, 1993, the contents of which are hereby incorporated by reference. It should be noted that in alternative embodiments, debugging information may be stored in differing formats other than dSYMs. For example, when developing for an Android based end user device, debugging information may be stored in a well-known de-obsfuscation (de-ob) data container (file) such as that generated by the Proguard software that is available under the GPL. As such, the description of using dSYM files should be taken to be exemplary only. It will be apparent to those skilled in the art that other types of processors and memory, including various computer-readable media, may be used to store and execute program instructions pertaining to the techniques described herein. Also, while the embodiments herein are described in terms of processes or services stored in memory, alternative embodiments also include the processes described herein being embodied as modules consisting of hardware, software, firmware, or combinations thereof.

FIG. 3 is a schematic block diagram of an exemplary IDE 300 in accordance with an illustrative embodiment of the present invention. The IDE may comprise a plurality of network interfaces 340, one or more processors 320, a memory 305, a storage device 325, and database 355 interconnected by a system bus 335. The network interfaces 340 contain the mechanical, electrical, and signaling circuitry for communicating data over physical links coupled to a network, such as links 105, 107, 130, 135, 140, 145, and 150. The network interfaces may be configured to transmit and/or receive data using a variety of different communication protocols, including, inter alia, TCP/IP, UDP, ATM, SONET, HTTP, wireless protocols, Frame Relay, Ethernet, Fiber Distributed Data Interface (FDDI), etc. Notably, a physical network interface 340 may also be used to implement one or more virtual network interfaces, such as for Virtual Private Network (VPN) access, known to those skilled in the art.

The memory 305 comprises a plurality of locations that are addressable by the processor(s) 320 and the network interfaces 340 for storing software programs and data structures associated with the embodiments described herein. The processor 340 may comprise necessary elements or logic adapted to execute the software programs and manipulate the data structures. An operating system 310, portions of which are typically resident in memory 305 and executed by the processor(s), functionally organizes the IDE by, inter alia, invoking network operations in support of software processes and/or services executing on the web server.

A developer analytic module 315, that is associated with the analytic service provider, portions of which are typically resident in memory 305 are executed by the processor(s), may functionally be installed onto IDE 300 by a user, such as a developer. The analytic module 315 may, for example, assist in gathering debugging information 230 associated with the developer's application on IDE 300. In accordance with various embodiments of the present invention, the developer analytic module 315 may perform various functions to aid in the development of applications by aiding the integration of the IDE with the analytic service provider. These various functions, described further below, help to ensure that the IDE is utilizing the most up to date SDK and to ensure that any necessary files, e.g., dSYMs are transferred to the web server, etc.

A storage device 325 may store debugging information 230, such as a dSYM file, that is associated with application 330 of the developer. Further, storage device 325 may also store the application 330 of the developer that may be written and compiled on IDE 300 by a developer, for example. An analytic library 345 and analytic source code 350, that are associated with an analytic service provider, may be installed/incorporated within application 330 of the developer through use of an analytic installer, that is described in further detail with reference to FIG. 6.

Database 355, is illustratively configured to store an index of the debugging information 360 that may be gathered by developer analytic module 315. For example, database 355 may store an index of a URL of a dSYM file by an identifier, e.g., a universally unique identifier (UUID), associated with the debugging information 230. In an illustrative embodiment, database 355 may be implemented using the well-known SQLite database, however, it should be noted that in alternative embodiments any type of data structure that permits indexing, including, e.g., hash tables, etc., may be used. As such, the description of a database should be taken as exemplary only. Also, while the embodiments herein are described in terms of processes or services stored in memory, alternative embodiments also include the processes described herein being embodied as modules consisting of hardware, software, firmware, or combinations thereof.

Figure 4:
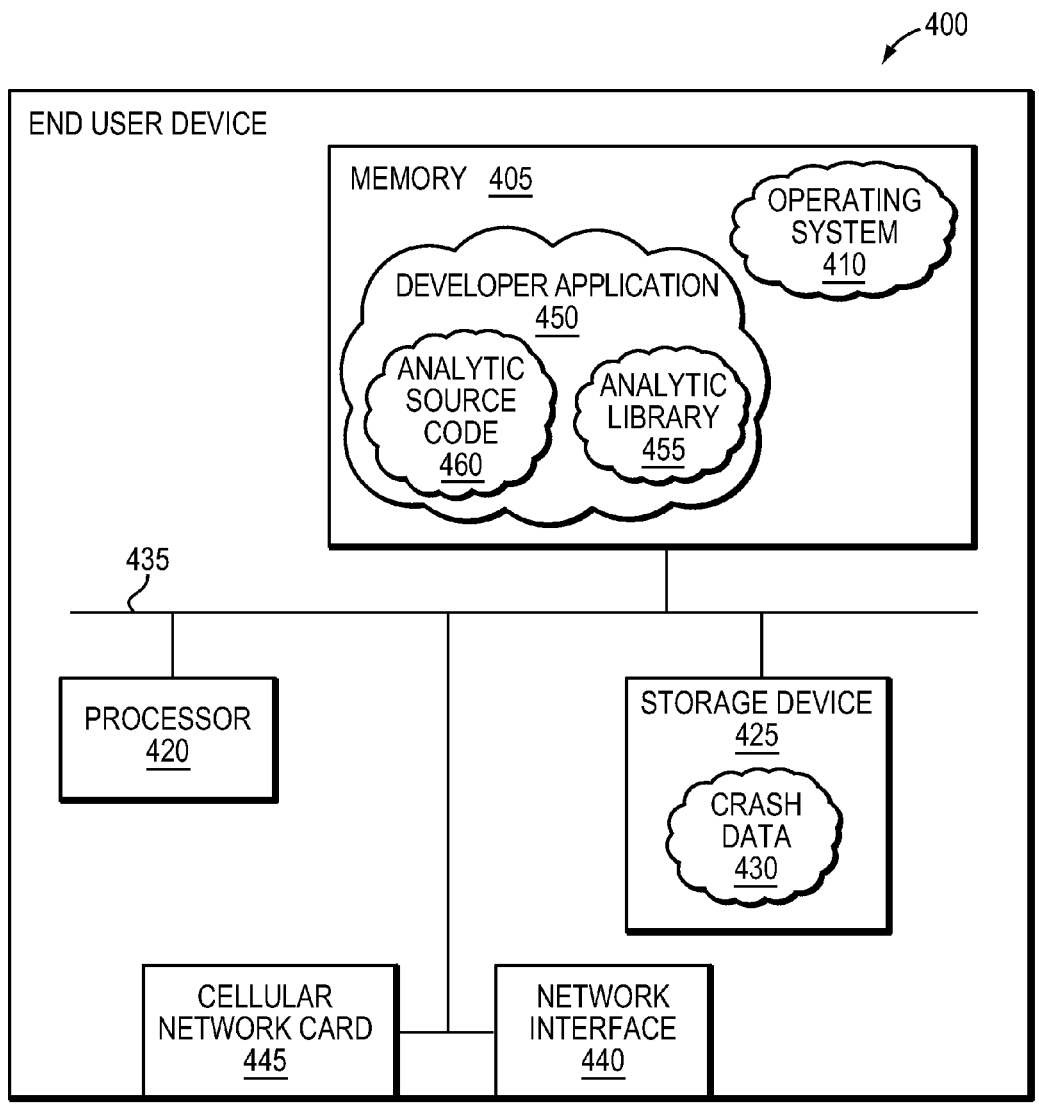
FIG. 4 is a schematic block diagram of an exemplary end user device in accordance with an illustrative embodiment of the present invention.

FIG. 4 is a schematic block diagram of an exemplary end user device 400 in accordance with an illustrative embodiment of the present invention. End user device 400 may comprise any device capable of executing applications. Illustratively, end user devices 400 may comprise a smart phone, a personal digital assistant and/or a tablet computer. Exemplary smart phones may utilize the Android operation system, available from Google, Inc., and/or the iOS system, available from Apple, Inc. It should be noted that other smart phones may be utilized in alternative embodiments. As such, the description herein directed to the development for iOS systems should be taken as exemplary only. The end user device may comprise network interfaces 440, one or more processors 420, a memory 405, a storage device 425, and a cellular network card 445 interconnected by a system bus 435. The network interfaces 440 and cellular network 445 contain the mechanical, electrical, and signaling circuitry for communicating data over physical links coupled to a network, such as links 105, 107, 130, 135, 140, 145, and 150. The network interface 440 and cellular network card 445 may be configured to transmit and/or receive data using a variety of different communication protocols, including, inter alia, TCP/IP, UDP, ATM, SONET, HTTP, wireless protocols, Frame Relay, Ethernet, Fiber Distributed Data Interface (FDDI), etc. Notably, a physical network interface 440 may also be used to implement one or more virtual network interfaces, such as for Virtual Private Network (VPN) access, known to those skilled in the art.

The memory 405 comprises a plurality of locations that are addressable by the processor(s) 420 and the network interfaces 440 for storing software programs and data structures associated with the embodiments described herein. The processor 420 may comprise necessary elements or logic adapted to execute the software programs and manipulate the data structures. An operating system 410, portions of which are typically resident in memory 405 and executed by the processor(s), functionally organizes the end user device by, inter alia, invoking network operations in support of software processes and/or services executing on the web server. An application 450, that may have been created by a developer on an IDE, and portions of which are typically resident in memory 405, are executed by the processor(s). Application 450 may be downloaded or installed on end user device 400 in any manner known to those skilled in the art. Further, application 450 includes analytic library 455 and analytic source code 460 that may have been incorporated within application 450 on IDE 300 by the developer. When the application 450 encounters a bug, crash data 430 associated with the bug and application (e.g., running processes, current RAM usage, IP address and network settings, physical orientation of the device in 3D space, among other aspects) may be created. Crash data 430 may be stored on storage device 425. Such storage devices may be non-volatile random access memory, flash, micro HD, etc. Also, while the embodiments herein are described in terms of processes or services stored in memory, alternative embodiments also include the processes described herein being embodied as modules consisting of hardware, software, firmware, or combinations thereof.

B. Overview of Analysis of Bugs in Application

Figure 5:
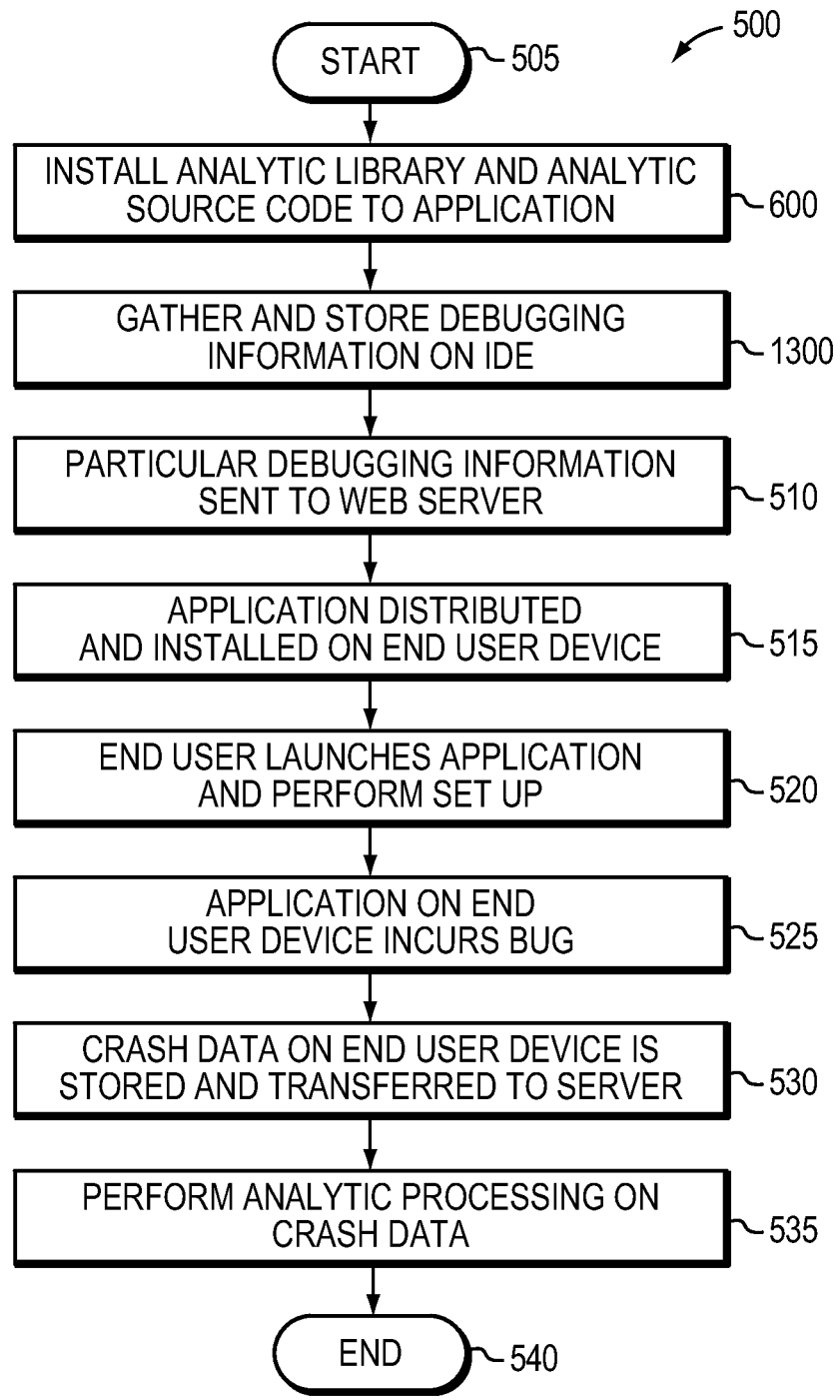
FIG. 5 is a flowchart detailing the steps of an exemplary procedure for providing a developer of an application pertinent information associated with bugs associated with the application that is executing on an end user's device in accordance with an illustrative embodiment of the present invention.

FIG. 5 is a flowchart detailing the steps of an exemplary procedure 500 for providing a developer of an application pertinent information associated with bugs associated with the application that is executing on an end user's device in accordance with an illustrative embodiment of the present invention. The procedure 500 starts at step 505 and continues to step 600, described below in reference to FIG. 6, where analytic source code and/or an analytic library is installed within the application on an IDE. In step 1300, debugging information (e.g., version number, icon, dSYM file) may be locally stored on the IDE. In step 510, particular debugging information, such as a dSYM file, may be automatically sent over a network, to web server 200, and stored at storage device 115. As explained above, the dSYM is capable of being automatically uploaded or sent to web server 200 due to the installation of the analytic source code an/or analytic library. Specifically, the integration of the analytic source code and/or analytic library may automatically detect when a new dSYM is generated on the IDE, de-duplicate the dSYM based on an identifier, and automatically upload or send the dSYM to the web server. A plurality of different types of messages may be utilized to transmit the particular debugging information from the IDE to the storage device, and other entities as described above in reference to FIG. 1. The particular debugging information is typically generated when the application developer compiles a new version of the application, i.e., a new "build" of the application. For example, and as known by those skilled in the art, a developer may select a particular command, such as a "DWARF with dSYM file", as a Debug Information Format in the build settings of an application (e.g., Xcode). A dSYM may then be generated automatically when the application is compiled. A noted advantage of the developer analytic module is that it is configured to monitor the location where such a dSYM file is stored within the storage space of the developer. As such, the dSYM file may be stored anywhere within the available storage of the developer's site and still be monitored by the developer analytic module. Further, and as described in further detail below, particular debugging information, such as an identifier, extracted from the debugging information that remains resident on the developer's system, is sent to the web server, wherein the identifier is associated with an address of the developer's system (e.g., IP address) and indexed.

In step 515, the application may be distributed and installed on end user devices, such as mobile phones or other entities. For example, the application may be downloaded on the end user device over a cellular network or any other type of network. For example, the application may be available to end users through libraries associated with particular end user devices (e.g., iTunes on an iPhone). The end user may then select the developer's application from the library and download the application on the end user device. The end user may then utilize the application on his/her end user device. In other instances, the application may simply be available on a particular website, that the user may find through conventional web based search techniques. After finding the application, the user may then download the application from the website and utilize the application on the end user device. As is known to those skilled in the art, applications may be available for installation on an end user device through various techniques, and the techniques described above are simply exemplary in nature.

In step 520, the application may be launched, by an end user for example, on the end user device. The end user may then utilize the application, that includes the analytic library and/or the analytic software, on the end user device. The end user, may for example, go through a series of set up steps associated with whether crash detection and reporting. For example, some user may determine that they do not want to enable crash detection and reporting for privacy reasons or other reasons. In such a case, the user of the end user device may indicate, utilizing a keypad associated with the end user device, that he/she wishes to disable crash detection and reporting on the end user device. Thereafter, for example when network connectivity is obtained (e.g., cell phone network or WIFI network), the preference indicated by the user may be transmitted to the web server. Thereafter, when the application incurs a bug, the crash data may remain on the end user device instead of sending the crash data to web server 200 for analytic processor.

In step 525, the application on the end user device encounters a bug. For example, the application may crash unexpectedly or may behave in a manner not intended. In step 530, crash data (e.g., running processes, current usage, network address and network settings, physical orientation of the device in 3D space, among other aspects) may be stored locally on the end user device. Thereafter, after network connectivity is obtained, the crash data may be sent to web server 200 and stored at storage device 115 that is managed by the analytic service provider. For example, the end user device may be out of "range" (e.g., in a tunnel) if he is utilizing a device that is trying to connect to a cellular phone network. Alternatively, the end user device may be device, such a laptop or iPad, that has WIFI connection capabilities, but for whatever reason has lost its connection or is not connected to the WIFI network. In step 535, analytic processing, that may be associated with the analytic service provider and/or the IDE, may be performed on the crash data, utilizing the dSYM file associated with the application and stored on storage device 115. Specifically, analytic processing logic 125 may be utilized by the analytic service provider to perform the processing. Alternatively, in step 535, analytic processing, associated with the IDE, may be performed on the crash data, utilizing the dSYM file associated with the application and stored locally on the IDE. Specifically, processor 320 of the IDE may be utilized to perform the analytic processing on the crash data. The procedure 500 then ends at step 540.

C. Installation Of Analytic Software

Figure 6:
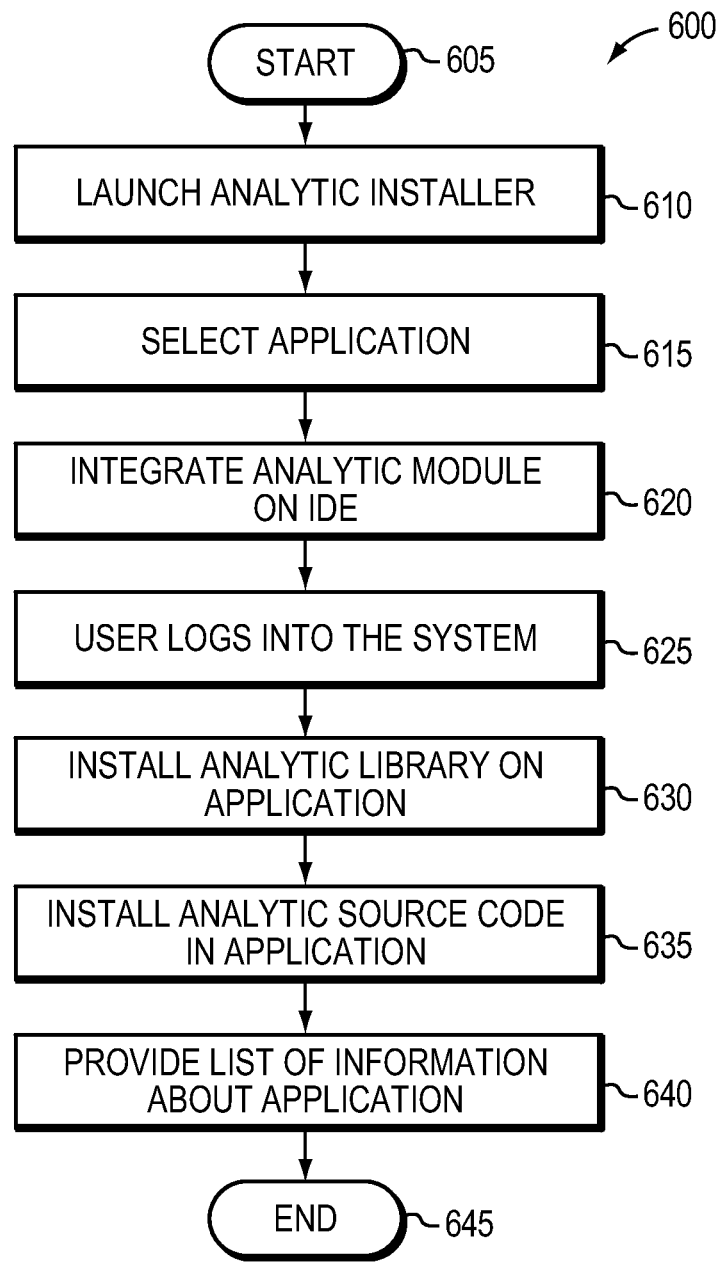
FIG. 6 is a flowchart detailing the steps of an exemplary procedure for installing analytic software on an IDE in accordance with an illustrative embodiment of the present invention.

FIG. 6 is a flowchart detailing the steps of an exemplary procedure 600 for installing analytic software, such as a software development kit ("SDK"), and the developer analytic module 315 on an IDE 300 in accordance with an illustrative embodiment of the present invention. It is noted that the SDK may be analytic software or any type of SDK, such as an advertising framework. Further, it is noted that the analytic software may be obtained in a variety of ways. For example, the analytic software may be downloaded on the IDE from a library (e.g., iTunes), or downloaded from a website. In an alternate embodiment, the launcher may reside at a remote location, and may simply reside thereon wherein the IDE may have access to the analytic software via the Internet. The procedure 600 starts at step 605 and continues to step 610, where an analytic installer is launched. For example, the analytic software may be launched utilizing a GUI or a command line interface (CLI), as known by those skilled in the art.

After the analytic software is launched, a developer may select an application with which the developer wishes to incorporate the analytic software on in step 615. After an application has been selected in step 615, the procedure continues to step 620, where a developer analytic module may be integrated on the developer's IDE. The developer analytic module, for example, may assist in gathering debugging information on the IDE that is associated with the application on the developer's IDE. The developer analytic module's functions, described further below, provides added functionality to developers to aid in developing applications.

After the analytic module has been integrated in step 620, the procedure continues to step 625, where the developer may log into the system (e.g., web server 215 that is managed by the analytic service provider) so that the developer's activity and files/applications associated with the developer may be tracked. It is noted, that if the user logs in prior to integrating the analytic module, step 625 may be skipped.

Once the developer has logged in at step 625, the procedure continues to step 630, where the analytic library may be installed in the application selected by the developer (e.g., selected in step 615).

The procedure continues to step 635, where analytic source code may be installed in the application selected by the developer. At step 640, after the developer logs in the system, he may be provided, through a list, or by any other layout, information associated with applications associated with the developer, information associated with bug(s) incurred by the applications associated with the developer, and other information associated with the developer. Referring back to FIG. 6, after the analytic software has been installed in step 640, procedure 600 ends at step 645.

D. Developer Analytic Module Functionality

In accordance with illustrative embodiments of the present invention, the developer analytic module that is installed in an IDE provides novel functionality to aid in the development of applications. One novel function performed by the developer analytic module is to track the location(s) of the SDK on the IDE. Illustratively, the developer analytic module may utilize searching functionality of the operating system's file system to track locations where the SDK is stored. For example, in a MacOS environment, the Spotlight functionality may be utilized to quickly located the SDK. Illustratively, the SDK may include an embedded identifier that enables easy identification. In alternative embodiments, functionality may be embedded in a run script that is used when a developer build a project using the SDK. As part of the run script, the developer analytic module is initiated. As the run script knows its own location, this location information is passed to the developer analytic module. The developer analytic module stores this location information for later use.

Figure 7:
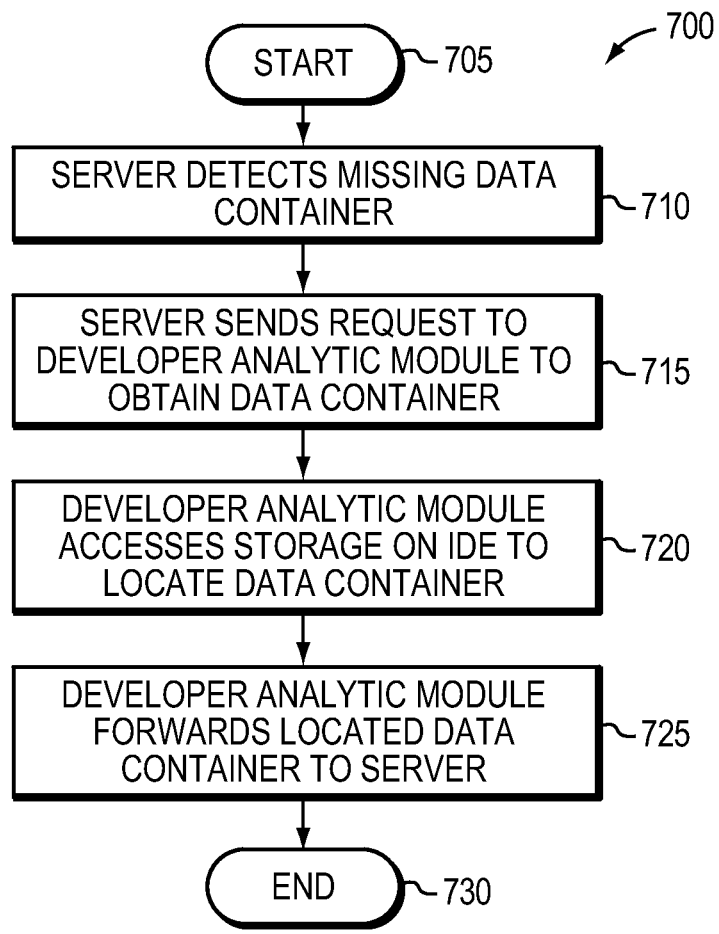
FIG. 7 is a flowchart detailing the steps of a procedure for a developer analytic module to obtain a missing data container at the request of a server in accordance with an illustrative embodiment of the present invention.

FIG. 7 is a flow chart detailing the steps of a procedure 700 for a developer analytic module to obtain a missing data container from a developer site in accordance with an illustrative embodiment of the present invention. The procedure 700 begins in step 705 continues to step 710 where the server detects a missing data container. Illustratively, the missing data container may comprise a dSYM file that is necessary for symbolication by the analytic processing logic 125 or, in alternative embodiments, may comprise another data container needed by the web server. In response to detecting a missing data container, the server sends a request to the developer analytic module to obtain the data container in step 715. This request is illustratively sent using conventional protocols between the web server and the developer analytical module as described in the above-incorporated U.S. patent application Ser. No. 13/426,493. In response to receiving request, the developer analytic module, in step 720, accesses storage on the IDE to locate the data container. This may be illustratively performed by interfacing with the file system and/or operating system of the computer executing the IDE. As will be appreciated by one skilled in the art, the developer analytic module is typically configured with known locations of the dSYMs or other files that would be of interest to the web server and/or analytic processing logic. Once the developer analytic module locates the requested data container it forwards the located data container to the server in step 725. This may be forwarded using techniques such as that utilized when initially forwarding a dSYM file to the server. More generally, any technique for transferring a data container may be utilized. The procedure 700 then completes in step 730.

Figure 8:
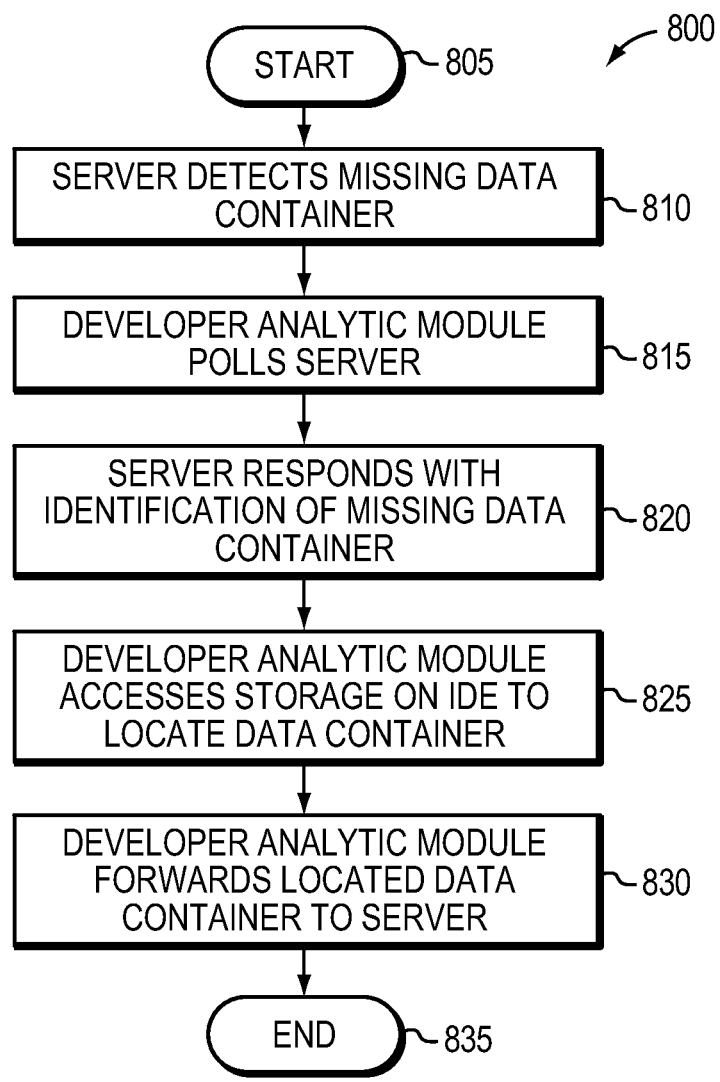
FIG. 8 is a flowchart detailing the steps of a procedure for a developer analytic module to obtain a missing data container in response to polling a server in accordance with an illustrative embodiment of the present invention.

FIG. 8 is a flow chart detailing the steps of a procedure 800 for a developer analytic module to obtain a missing data container from a developer site in accordance with an illustrative embodiment of the present invention. The procedure 800 begins in step 805 and continues to step 810 where the server detects a missing data container. As noted above in reference to FIG. 7, the server may detect a missing data container when it attempts to perform a function that requires the data container, for example, a dSYM file which is not stored at the web server. Upon detecting the missing data container, the server makes a note of the missing container by, e.g., storing information relating to the missing data container in a temporary data container, and which developer application module would be able to provide a copy of the data container. In the illustrative embodiment described in procedure 800, the developer analytic module polls the server at routine times in step 815. This polling may be configurable to be performed at set time intervals or may be configured to be performed in response to certain actions. For example, the developer analytic module may be configured to poll the server or on a daily basis. Alternatively, it can be configured to poll the server in response to the compilation and linking of a new version of an application or in response to a developer command. The polling may be performed by sending a query message from the developer analytic module to the server. In response to the polling request, the server responds with an identification of the missing data container in step 820. In response to receiving the identification of the missing data container, the developer analytic module accesses storage on the IDE to locate the data container. As noted above the relation to FIG. 7, this may be performed by interfacing with the operating system and/or file system of the computer executing the IDE. The developer analytic module then forwards the located data container to the server in step 830. The procedure 800 then completes in step 835.

More generally, procedures 700 and 800 enable the developer analytic module to interface to the file system of the IDE to enable the acquisition of data containers, such as dSYMs files, without requiring the manual forwarding in response to a need for a data container by the web server. By providing a mechanism for forwarding data containers to the server without user intervention, the developer analytic module may improve development cycles, reduces developer time and requirements and enables the server and its analytic processing to be performed in a more efficient manner.

Figure 9:
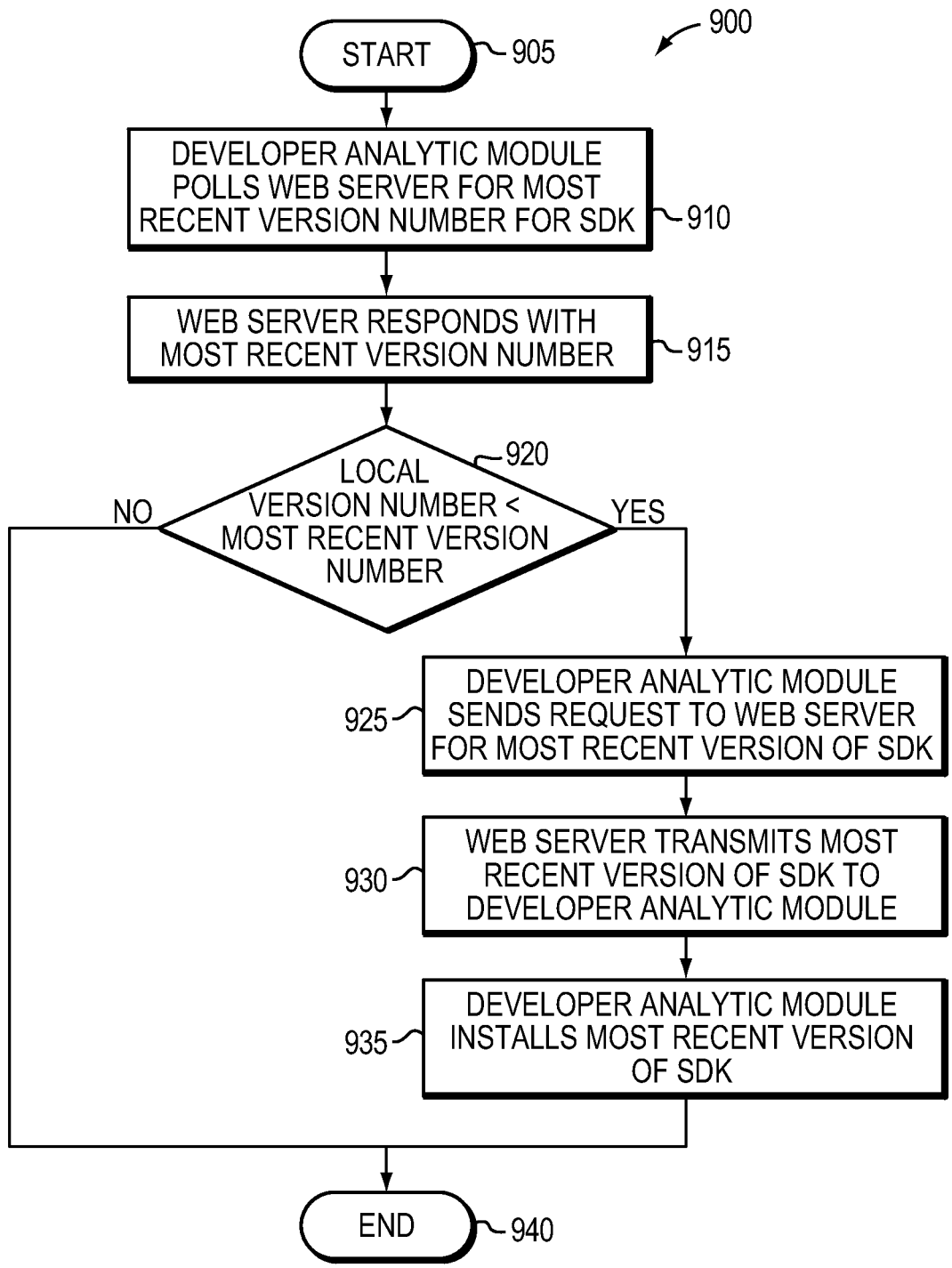
FIG. 9 is a flowchart detailing the steps of a procedure for a developer analytic module to obtain the most recent version of a SDK from a server in accordance with an illustrative embodiment of the present invention.

FIG. 9 is a flow chart detailing the steps of a procedure 900 for automatically updating a SDK to the most recent version in accordance with an illustrative embodiment of the present invention. The procedure 900 begins in step 905 and continues to step 910 where the developer analytic module polls the web server for a most recent version number for the SDK. As will be appreciated by one skilled in the art, any unique identifier may be utilized to identify different versions of an SDK. As such, the use of the term version number should be taken as exemplary only. This pulling may be performed on a routine basis or may be the result of user action. For example, the developer analytic module may poll the web server for a most recent version on a weekly basis. In alternative embodiments, the developer analytic module may poll the web server in response to a developer issuing a command to the developer analytic module. As such, the description of the developer analytic module automatically polling the web server should be taken as exemplary only. Then, in step 915, the web server responds with a most recent version number. Illustratively, as will be appreciated by those skilled in the art, each version of the SDK is assigned a unique version number, e.g., version 1.0, version 1.01, etc. As the SDK is maintained and generated by the analytic provider that hosts the web server, the web server has knowledge of the most recent version. The most recent version number is forwarded to the developer analytic module by the web server in step 915.

Upon receiving the most recent version number, the developer analytic module then, in step 920, determines whether its local version number is less than the most recent version number. That is, the developer analytic module determines whether or not it contains the most recent version of the SDK. More generally, the developer analytic module determines whether it has the most recent version. In alternative embodiments, the various versions may not utilize a version number. In such alternative embodiments, the developer analytic module, in step 920, determines whether the local version identifier is different from the identifier of the most recent version of the SDK. If the two identifiers differ, then the developer analytic module knows that the version stored locally is not the most recent version. If the developer analytic module determines that it contains most recent version number, the procedure 900 then branches to step 940 and completes. However, if in step 920, it is determined that the local version number is less than the most recent version number, the procedure 900 branches to step 925 with the developer analytic module sends a request to the web server for the most recent version of the SDK. In response to receiving the request, the web server transmits the most recent version of the SDK to the developer analytic module and step 930. Upon completion of the transfer, the developer analytic module then installs the most recent version of the SDK in step 935 before the procedure 900 completes in step 940.

Figure 10:
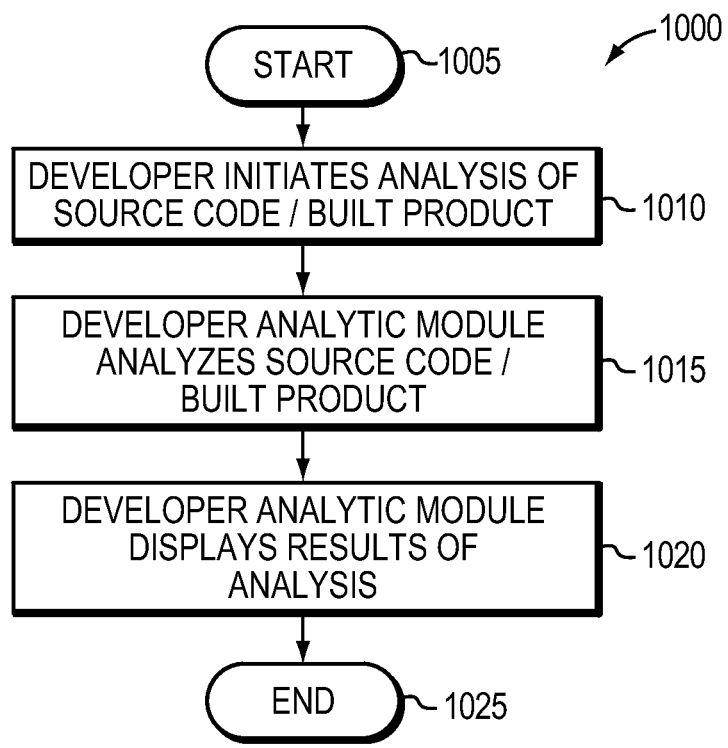
FIG. 10 is a flowchart detailing the steps of a procedure for performing a static analysis of a source code and/or built product by a developer analytic module in accordance with an illustrative embodiment of the present invention.

FIG. 10 is a flow chart detailing the steps of the procedure 1000 for performing a source code/built project analysis in accordance with an illustrative embodiment of the present invention. The procedure 1000 begins in step 1005 and continues to step 1010 where the developer initiates an analysis of a source code/built project. Illustratively, this analysis may be initiated by the developer executing a command within the developer analytic module that, for example, identifies a particular set of source code and/or a built project to be analyzed. In alternative embodiments, this analysis may be automatically initiated in response to, e.g., the developer builds a project, etc. In further alternative embodiments, the analysis may be initiated in response to other actions of the developer, other software and/or operations being performed. As such, the description of a developer manually initiating the analysis should be taken as exemplary only. In response, the developer analytic module analyzes the source code/built product in step 1015. Illustratively, this analysis may be performed to ensure that the application source code and/or the built project meets certain requirements. For example, the Apple App Store as part of iTunes has a set of published requirements for applications to be sold via the store. The analysis may implement functionality to perform a check of the source code against published standards to identify portions of the source code that are not in compliance. Once the analysis is completed, the developer analytic module then displays the results of the analysis in step 1020 before the procedure 1000 completes in step 1025. The results may indicate that, e.g., the source code/built project is in compliance with the standards or may indicate those procedures/modules that are not in compliance along with information as to how they are out of compliance. This information may be utilized by the developer to revise the application prior to submission to an application store, etc.

Developer Application Module Graphical User Interface

Figure 11:
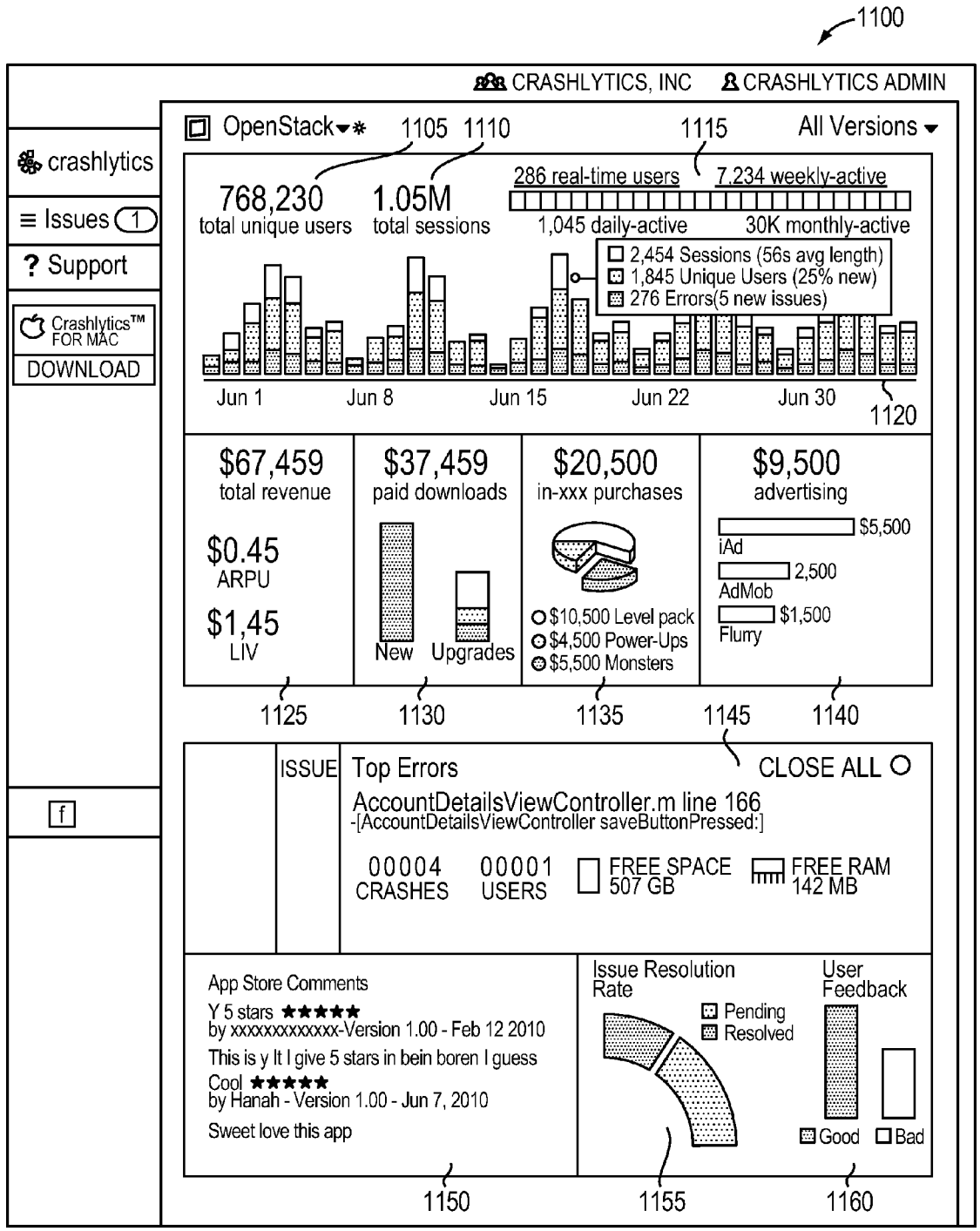
FIG. 11 is an exemplary graphical user interface (GUI) window displayed to a developer by a developer analytic module in accordance with an illustrative embodiment of the present invention.

FIG. 11 is a screenshot of an exemplary graphical user interface window 1100 displayed by the developer application module in accordance with an illustrative embodiment of the present invention. Window 1100 illustratively displays an exemplary dashboard that the developer application module generates for a developer in order to provide high level overview of certain data associated with a particular application. The GUI window 1100 illustratively comprises a plurality of fields of data that may be displayed in a variety of ways including, e.g., numerically, via bar chart, a pie chart, text block, etc. As such, the description of any particular field should be taken as exemplary only.

A total unique users field 1105 displays the total number of unique users of an application. A unique user illustratively comprises a user that has installed the application on an end user device. Illustratively, if a user installs the application on a plurality of end user devices, e.g., both an iPhone and an iPad, the user is only counted once for the purpose of determining unique users. However, the developer analytic module may record the number of unique devices that an application is installed on and may, in alternative embodiments, display the total number of unique devices. The total sessions field 1110 displays the total number of times that the application has been started. A user bar graph 1115 provides information about the number of users who are currently using the application, who have used the application today, in the past week and within the past month.

A sessions bar chart 1120 provides information relating to historical usage of the application. Bar chart 1120 provides a day by day graph of, e.g., the number of times an application was utilized, the number of unique users and the number of errors encountered. This enables a developer to see trends over time in number of sessions invoked as well as number of error occurrences. The central part of window 1100 displays various financial statistics. Exemplary field 1125 displays a total revenue amount, while fields 1130, 1135 and 1140 break down the total revenue by showing the amount generated by paid downloads 1130, in-application purchases 1135 and advertising 1140.

A top errors field 1145 displays various information relating to the top errors associated with the application. Illustratively, the field 1145 displays the module and line where the error occurred, a number of times that a crash occurred because of this error, the number of users affected and diagnostic information relating to the devices on which the crashes have occurred.

A comments field 1150 displays comments received from an application store, such as the iTunes store provided by Apple, Inc. The comments field 1150 displays both the ratings received by an application, e.g., either numerically or via a star based rating, as well as text comments associated with the application in the application store. An issue resolutation rate chart 1155 displays the percentage of issue that have been resolved and/or are currently pending. Finally, a user feedback bar chart 1160 displays the percentage of user feedback that is either positive or negative.

It should be noted that the layout and fields displayed in window 1100 are for illustrative purposes and that, as one skilled in the art will appreciate, variations in layout, changes in the number and/or types of fields displayed as well as the types of data displayed may be modified without departing from the spirit and scope of the invention. As such, the description of GUI window 1100 should be taken as exemplary only.

Figure 12:
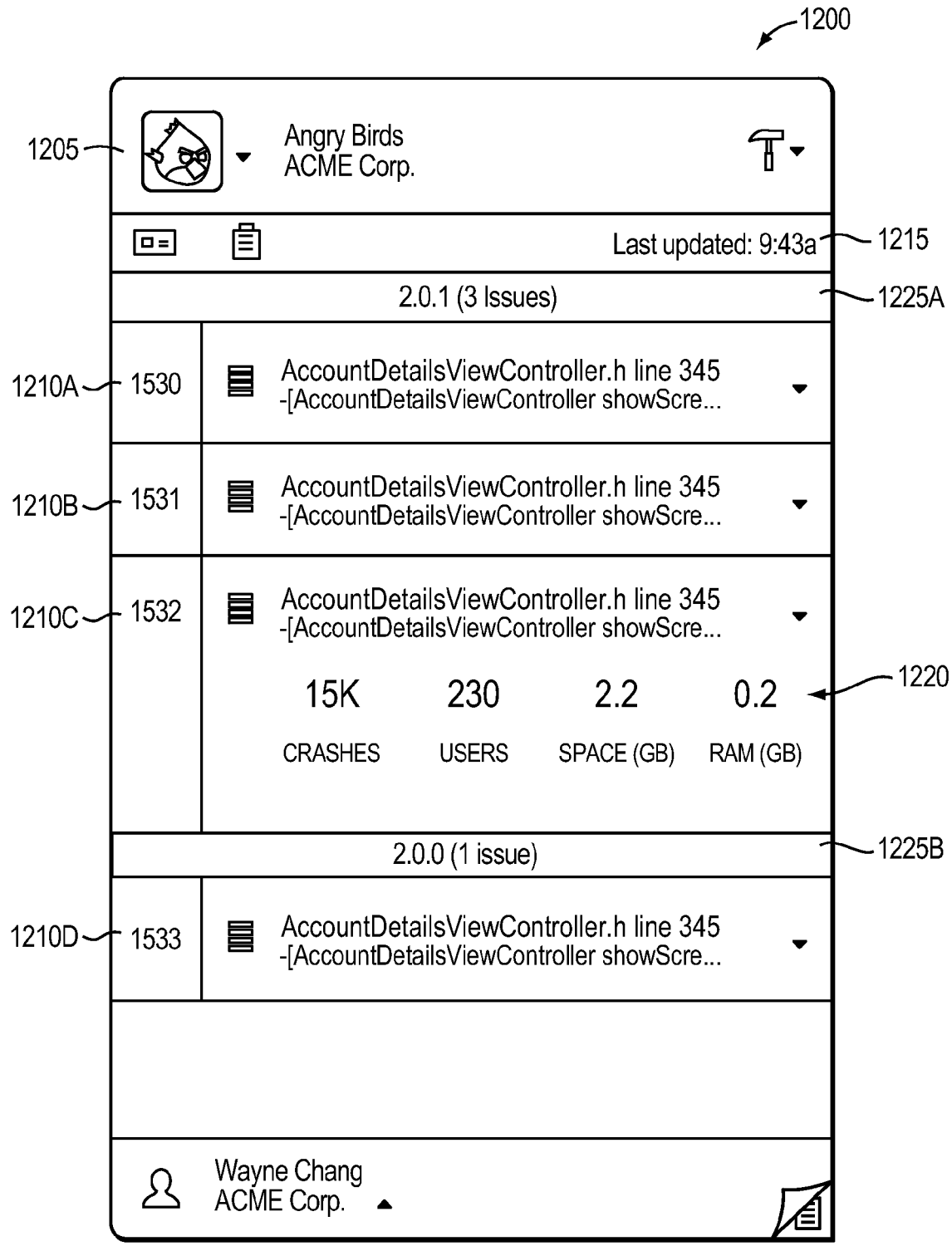
FIG. 12 is an exemplary GUI window displayed to a developer in accordance with an illustrative embodiment of the present invention.

FIG. 12 is an exemplary screenshot of a graphical user interface window 1200 in accordance with an illustrative embodiment of the present invention. Window 1200 illustrates an exemplary bug reporting window that the developer application module may display to a developer to aid in tracking and managing the resolution of bugs in an application. Further in an alternative embodiment, the GUI displayed by the developer analytic module may be implemented in a mobile application that is viewable on a developer's end user device, e.g., an iPhone. By utilizing a mobile application to display this information, a developer may track bug resolutions and other statistics from where ever the developer is located. As such, the description of window 1200 being displayed by the developer analytic module should be taken as exemplary only. An application identification field 1205 identifies the application and developer associated with the particular window 1200. Illustratively window 1200 is separated into partitions 1225A,B each associated with a particular revision or release of the application being developed. In the exemplary window 1200, partition 1225A is associated with version 2.0.1 and identifies that there are three issues, while partition 1225B is associated with version 2.0.1 and identifies that there is one issue with that version of the application.

Window 1200 also displays a plurality of entries 1210A, B,C,D, each of which is associated with a particular bug or other error. Exemplary entry 1210C has been expanded and shows a number of fields 1220. Fields 1220 include, e.g., an identification of the source code file and line number causing the bug, statistics relating to the number of crashes, the number of users affected by the bug and the amount of memory being utilized by the application.

It should be noted that the layout and fields displayed in window 1200 are for illustrative purposes and that, as one skilled in the art will appreciate, variations in layout, changes in the number and/or types of fields displayed as well as the types of data displayed may be modified without departing from the spirit and scope of the invention. As such, the description of GUI window 1200 should be taken as exemplary only.

Figure 13:
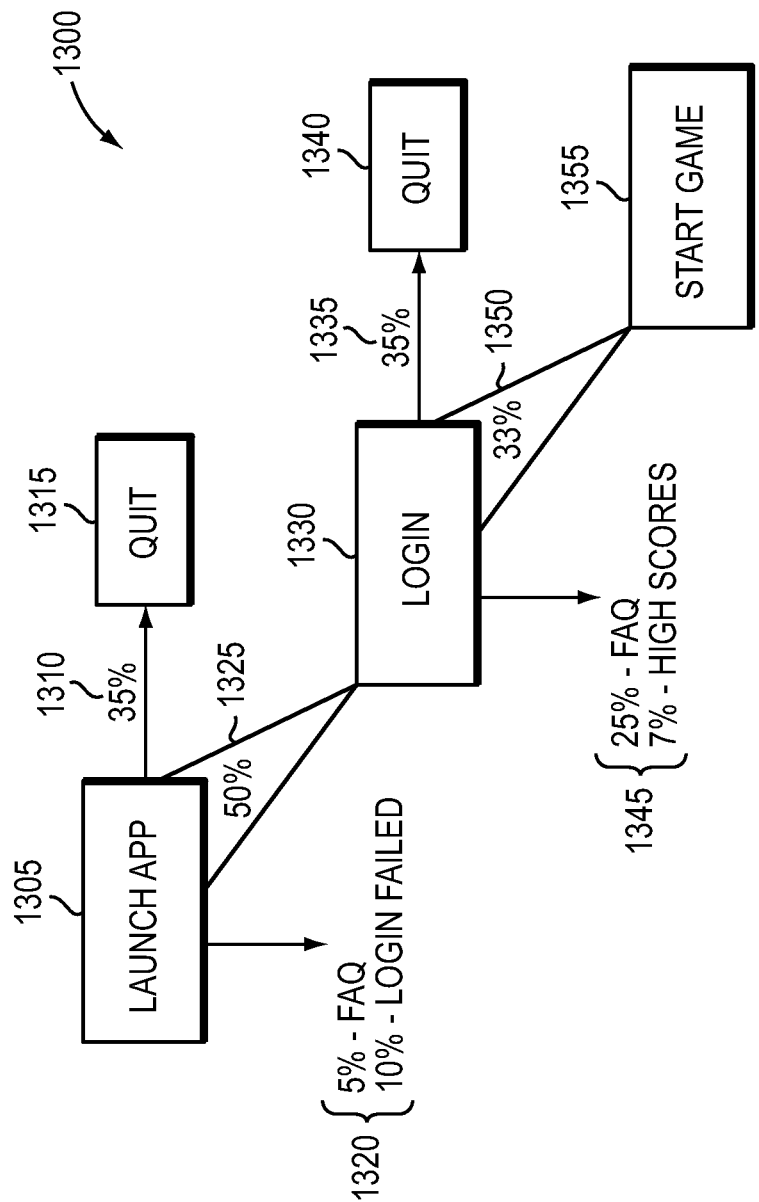
FIG. 13 is an exemplary GUI window displayed to a developer in accordance with an illustrative embodiment of the present invention.

FIG. 13 is an exemplary user flow diagram window 1300 that may be displayed to a developer by the developer analytic module than in accordance with an illustrative embodiment of the present invention. The SDK integrated into the application executing on the end user device may collect various flow statistics that are then forwarded to the developer analytic module. As used herein, a flow statistic may comprise a recording of the number of times a particular option occurs at particular branch points. For example, upon initialization of an application, a user may login to the application, a user may immediately quit the application due to, e.g., accidentally launching the application, a user may select an administrative function other than login in (e.g., viewing a FAQ or copyright notice, etc.) or there may be a login failure. Such flow statistics may be recorded by the SDK integrated into the application. At regular intervals, or when forwarding crash data to the web server, the SDK may forward the flow statistics to the web server. The web server may then forward the flow statistics to the developer application module. Flow statistics may be utilized by a developer to track the usage of various procedure flows within the application. This information may be used for optimization, etc. in preparing new versions of a particular application.

The flow statistics window 1300 is illustratively generated by the developer application module using the collected flow statistics. It should be noted that the flow statistics shown in window 1300 are exemplary only. As will be appreciated by one skilled in the art, differing flows may be utilized based on the structure and/or organizational procedural flow of a particular application. As such, window 1300 should be taken as exemplary only.

Exemplary flow statistics window 1300 shows that an application is launched in box 1305. Three paths from box 1305 are illustrated. Path 1310 shows a percentage of users of the application that quit the application in box 1315. In the exemplary flow statistics window 1300, path 1310 indicates that 35% of users launch the application in box 1305 and then immediately quit the application in box 1315. Further a miscellaneous path 1320 shows the other potential outcomes including, e.g., a user accessing a frequently asked question functionality (5%) and/or a failure of a login operation (10%). Path 1325 indicates that upon launching the application in box 1305, the user proceeds to the login functionality of the application in box 1330.

From box 1330, three paths indicate possible program flow, namely a path 1335 that indicates 35% of users then quit the application in box 1340, a path 1350 that indicates that 33% of users begin the game or application in box 1355 and a path 1345 that indicates that users access miscellaneous functionality, such as reviewing a FAQ (25%) and/or checking on high scores (7%).

By collecting and displaying program flow statistics, the developer application module provides useful information to application developers to identify most commonly utilized routines, etc. As will be appreciated by those skilled in the art, the developer application module may collect and display much more complicated program flow statistics than those shown in window 1300. As such, the illustrative program flow statistics shown in window 1300 should be taken as exemplary only.

It should be noted that the various descriptions and embodiments described herein are exemplary only. The aspects of the invention may be implemented in software, such as a non-transitory computer readable medium, hardware, firmware or any combination thereof. Further, while this description is written in reference to particular operating systems and/or IDEs, one skilled in the art will appreciate that the functionality may be implemented in differing environments. As such, the description of a MacOS environment should be taken as exemplary only.

What is claimed is:

1. A system comprising:
a server having a processor and a memory, the server configured to:
receive, for a software development toolkit (SDK), a polling command from a developer analytic module of an integrated development environment (IDE) executing on a developer computing device;
transmit a current version of the SDK to the developer analytic module after a current version identifier of the SDK is compared with a local version identifier of the SDK to determine that the SDK is outdated, wherein the current version of the SDK is installed in source code of an application, by the IDE, to generate a binary of the application;
receive debugging information associated with the binary, wherein the debugging information is automatically sent by the IDE;
receive crash data associated with the application encountering a bug on an end user device; and
perform, using the debugging information, analytic processing on the crash data to identify information associated with the bug encountered by the application on the end user device.

2. The system of claim 1 wherein the debugging information comprises a dSYM file.

3. The system of claim 1 wherein the server is associated with an analytic service provider.

4. The system of claim 1 wherein the developer analytic module is configured to access storage devices associated with the IDE by issuing function calls to a file system associated with an operating system executing on a processor of the IDE to obtain the debugging information and transmit the debugging information to the server.

5. The system of claim 1 wherein the server is further configured to send a request for the debugging information to the developer analytic module in response to the developer analytic module polling the server.

6. The system of claim 1 wherein the current version of the SDK is downloaded by the developer analytic module.

7. The system of claim 1 wherein the developer analytic module is configured to forward, via one or more network links, the requested debugging information to the server.

8. The system of claim 1 wherein the developer analytic module is configured to display a graphical user interface (GUI) to on a display of the developer computing device to provide information regarding applications of the IDE.

9. A method comprising:
receiving, at a server having a processor a memory, a polling command for a software development toolkit (SDK) from a developer analytic module of an integrated development environment (IDE) executing on a developer computing device;
transmitting, by the server, a current version of the SDK to the developer analytic module after a current version identifier of the SDK is compared with a local version identifier of the SDK to determine that the SDK is outdated, wherein the current version of the SDK is installed in source code of an application, by the IDE, to generate a binary of the application;
receiving debugging information associated with the binary, wherein the debugging information is automatically sent by the IDE;
receiving crash data associated with the application encountering a bug on an end user device; and
performing, using the debugging information, analytic processing on the crash data to identify information associated with the bug encountered by the application on the end user device.

10. The method of claim 9 wherein the debugging information comprises a dSYM file.

11. The method of claim 9 wherein the server is associated with an analytic service provider.

12. The method of claim 9 wherein the developer analytic module accesses storage devices associated with the IDE by issuing function calls to a file system associated with an operating system executing on a processor of the IDE to obtain the debugging information and transmit the debugging information to the server.

13. The method of claim 9 further comprising sending, by the server, a request for the debugging information to the developer analytic module in response to the developer analytic module polling the server.

14. A non-transitory computer readable medium comprising program instructions configured to execute on one or more computer processors to enable the computer processors to:
receive a polling command for a software development toolkit (SDK) from a developer analytic module of an integrated development environment (IDE) executing on a developer computing device;
transmit a current version of the SDK to the developer analytic module after a current version identifier of the SDK is compared with a local version identifier of the SDK to determine that the SDK is outdated, wherein the current version of the SDK is installed in source code of an application, by the IDE, to generate a binary of the application;
receive debugging information associated with the binary, wherein the debugging information is automatically sent by the IDE;
receive crash data associated with the application encountering a bug on an end user device; and
perform, using the debugging information, analytic processing on the crash data to identify information associated with the bug encountered by the application on the end user device.

15. The non-transitory computer readable medium of claim 14 wherein the debugging information comprises a dSYM file.

16. The non-transitory computer readable medium of claim 14 wherein the developer analytic module accesses storage devices associated with the IDE by issuing function calls to a file system associated with an operating system executing on a processor of the IDE to obtain the debugging information and transmit the debugging information to the server.

17. The non-transitory computer readable medium of claim 14, wherein the program instructions further enable the computer processor to:
send a request for the debugging information to the developer analytic module in response to the developer analytic module polling the server.

* * * * *